United States Patent [19]

Peascoe et al.

[11] 4,319,014
[45] Mar. 9, 1982

[54] ACID STABLE SURFACTANT

[75] Inventors: Warren J. Peascoe, Woodbridge, Conn.; Woodrow W. White, Baton Rouge, La.; Linda E. Somma, Waterbury, Conn.

[73] Assignee: Uniroyal, Inc., New York, N.Y.

[21] Appl. No.: 98,574

[22] Filed: Nov. 29, 1979

[51] Int. Cl.³ .................. C08F 228/02; C08F 2/26
[52] U.S. Cl. .................. 526/287; 526/202; 526/203; 526/224; 526/240; 526/241; 524/547
[58] Field of Search ............ 260/29.6 TA; 526/287, 526/240, 241

[56] References Cited

U.S. PATENT DOCUMENTS

| | | | |
|---|---|---|---|
| 2,471,959 | 5/1949 | Hunt | 526/218 |
| 3,028,367 | 4/1962 | O'Brien | 526/320 X |
| 3,033,833 | 5/1962 | Le Fevre | 526/287 |
| 3,316,200 | 4/1967 | Hatala | 260/29.6 TA |
| 3,776,874 | 12/1973 | Dannals | 260/29.6 TA |
| 3,907,870 | 9/1975 | Kozuka | 260/29.6 AN |
| 4,073,995 | 2/1978 | Baatz | 260/29.6 TA |

Primary Examiner—C. A. Henderson
Attorney, Agent, or Firm—James J. Long; Paul H. Ginsburg

[57] ABSTRACT

An acid-stable surfactant, soluble in aqueous acidic medium, useful in emulsion polymerization, which is a copolymer containing the groups

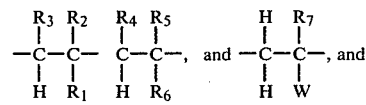

having one R—Z— group and one —H group as terminal groups wherein R is a hydrocarbon group,

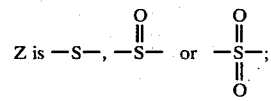

$R_1$ is —$CO_2CH_3$, —$CO_2C_2H_5$, —$CO_2NH_5$ or —CN; each $R_2$, each $R_3$, each $R_4$, each $R_5$ and each $R_7$ may be the same or different and each $R_2$, $R_3$, $R_4$, $R_5$ and $R_7$ is hydrogen or methyl; $R_6$ is a group of the formula —$CO_2H$ or its salt or a group of the formula —V—$CO_2H$ or its salt wherein V is alkyl, aryl, aralkyl or alkaryl; W is a group containing a sulfonic acid or a salt of a sulfonic acid or W is a sulfonic acid group or its salt.

3 Claims, No Drawings

ACID STABLE SURFACTANT

BACKGROUND OF THE INVENTION

The present invention relates to a surfactant that is soluble in an acidic aqueous medium, such as an acidic aqueous emulsion of polymerization medium as described below. This surfactant is useful as an emulsifier, particularly as an emulsifier for the preparation of latex polymers, for example, the latex polymerization of vinyl acetate.

The copolymers of the present invention have a very low level, compared to compounds of the prior art, of ethylenically unsaturated monomer which contains a sulfonic acid (or its salt) substituent. The use of such low levels of the sulfonate containing monomer is advantageous since such monomers are expensive.

SUMMARY OF THE INVENTION AND DESCRIPTION OF THE PREFERRED EMBODIMENTS

The surfactant of the present invention is a copolymer containing the groups

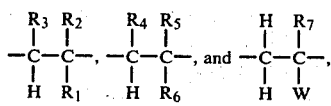

having one R—Z— group and one —H group as terminal groups. In the aforementioned groups, R is a hydrocarbon group, preferably having 6 to 20 carbon atoms, for example, alkyl, alkenyl, alkynyl, aryl (for example, phenyl and naphthyl), aralkyl and alkaryl;

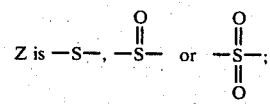

$R_1$ is —$CO_2CH_3$, —$CO_2C_2H_5$, —$CO_2NH_2$ or —CN; each $R_2$, each $R_3$, each $R_4$, each $R_5$ and each $R_7$ may be the same or different and each $R_2$, $R_3$, $R_4$, $R_5$ and $R_7$ is either hydrogen or methyl; $R_8$ is a group of the formula —$CO_2H$ or its salt (for example, the alkali metal or alkaline earth metal salt) or a group of the formula —V—$CO_2H$ or its salt wherein V is alkyl, aryl, aralkyl or alkaryl and preferably contains 1 to 12 carbons; W is a group containing a sulfonic acid or a salt of a sulfonic acid (for example, an alkyl or aryl sulfonic acid, alkyl sulfonic acids of carboxylic acids, for example, —$CO_2CH_2SO_3H$, or alkyl sulfonic acids of carboxamides, for example, —$CONHC(CH_3)_2CH_2SO_3H$, said alkyl sulfonic acids preferably having 1 to 12 carbon atoms, said aryl sulfonic acids preferably having 1 to 12 carbon atoms, the aforementioned alkyl sulfonic acids of carboxylic acids preferably having 1 to 12 carbon atoms and said alkyl sulfonic acids of carboxamides preferably having 1 to 12 carbon atoms, or W is a sulfonic acid group or its salt. The polymer of the present invention has a molecular weight of 500 to 10,000, preferably 700 to 5,000 (As shown in "Free Radical Telomerization" (1974) by C. M. Starks, at page 2, products obtained by "telomerization", sometimes referred to as "oligomerization", are conventionally characterized by their weight average molecular weight.). The R groups are 0.8 to 50 percent by weight, preferably 2 to 25 percent by weight, of the copolymer; the W groups are 0.15 to 16 percent by weight, preferably 1 to 12 percent by weight, of the copolymer; the $R_1$ groups are 0 to 51 percent by weight, preferably 15 to 45 percent by weight, of the copolymer; and the $R_6$ groups are 10 to 60 percent by weight, preferably 12 to 35 percent by weight, of the copolymer. The weight percents of the remaining groups are not critical.

The present invention also relates to latices prepared using an effective amount of the aforementioned copolymer as a surfactant and to methods of preparing latices using the aforementioned copolymers as a surfactant. In preparing such latices the amount of copolymer required can readily be determined by one skilled in the art. Preferably 0.1 to 7 percent by weight, more preferably 0.25 to 5 percent by weight, based on the weight of monomer should be used.

In addition to use as the sole surfactant for latex polymerizations, the copolymers of the present invention may be used for latex polymerization in conjunction with other surfactants. The copolymers of the present invention may also be used as emulsifiers or in combination with other emulsifiers for the preparation of emulsions, for example an emulsion of oil and water or water insoluble monomers and water.

The compounds of the present invention may be prepared from the following components: an unsaturated carboxylic acid (for example, acrylic acid, methacrylic acid, vinyl acetic acid, or crotonic acid) another unsaturated monomer which does not contain a carboxylic acid group, an unsaturated monomer containing a sulfonic acid group or its salt, and a mercaptan.

The aforementioned monomer which does not contain a carboxylic acid group may also have the following structure:

where $R_1$ is —$CO_2CH_3$, —$CO_2C_2H_5$, —$CO_2NH_2$, —CN, —$CO_2CH_2CH_2OH$, or —$CONHCH_2OH$ and $R_2$ and $R_3$ are either methyl or hydrogen. Examples of other monomers which do not contain a carboxylic acid and which may also be used are styrene, butadiene, vinyl chloride and vinylidene chloride.

Examples of the sulfonated monomers that can be used in the compositions of the present invention are the following:

(1) Sulfonated alkenyl aromatic monomers of the structural formula

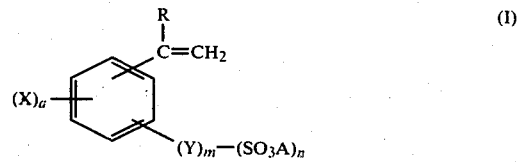

wherein R is hydrogen or methyl; each X may be the same or different and is hydrogen, chlorine, bromine or an alkyl radical containing from 1 to 8 carbon atoms; each Y is the same or different and is a bivalent or trivalent hydrocarbon radical containing 1 to 4 carbon atoms; each A is the same or different and is hydrogen, ammonium, an alkali metal (for example, sodium, potassium, cesium an alkaline earth metal (for example, calcium, barium, magnesium, strontium) or a transition metal (for example, zinc, copper, nickel, cobalt, iron, manganese, chromium, vanadium, titanium); a is an integer from 1 to 4; m is 0 or 1; n is 1 or 2;

(2) Sulfonated olefin monomers of the formula $$CH_2=CT-(Y)_m-(SO_3A)_n \qquad (II)$$

wherein T is hydrogen, chlorine, bromine, carboxyl having 1 to 6 carbon atoms, aryl or aralkyl containing from 6 to 12 carbon atoms, and alkyl containing from 1 to 8 carbon atoms, and Y, A, m and n are as defined for monomer (I); and (3) Sulfonated acrylate and methacrylate monomers of the formula $$CH_2=CR-CO-Q-Y-(SO_3A)_n \qquad (III)$$

wherein Q is oxygen or —NR—; and R,Y,A, and n are as defined for monomer (I).

The aforementioned sulfonated aromatic and the sulfonated olefin monomers are described in U.S. Pat. No. 2,527,300, and the aforementioned sulfonated acrylate and methacrylate monomers are described in U.S. Pat. No. 3,024,221.

Specific examples of the various sulfonated monomers that may be employed with benefit in the practice of the present invention are those included in the following tabulations, grouped according to general type:

TABLE I
Sulfonated aromatic monomers of Formula I para-styrene-sulfonic acid
ortho-styrene sulfonic acid
para-isopropenyl sulfonic acid
para-vinyl-alpha-toluene sulfonic acid
para-isopropenyl-alpha-toluene sulfonic acid
sodium para-styrene sulfonate
potassium ortho-styrene sulfonate
2-chloro-4-vinylbenzene sulfonic acid
2-bromo-4-isopropenyl benzene sulfonic acid
3-vinyl toluene 6-sulfonic acid, sodium salt
3-ethyl-4-vinyl-benzene sulfonic acid
2,3-dichloro-4-vinyl benzene sulfonic acid
1,3-disulfo-2-(4-vinyl) propane

TABLE 2
Monomers of the Formula II potassium ethylene sulfonate
1-propene 3-sulfonic acid
1-propene 2-sulfonic acid
1-butylene 3-sulfonic acid
2-methyl 1-propene 3-sulfonic acid
sodium ethylene sulfonate

TABLE 3
Sulfoalkylacrylates of the Formula III 2-sulfoethylmethacrylate, sodium salt
2-sulfoethylmethacrylate, potassium salt
1,3-disulfo 2-propanol ester of methacrylic acid
2-sulfoethylacrylate
3-sulfopropylacrylate sodium salt

TABLE 4
Sulfoacrylamides of the Formula III

N-acryloyl taurine
N-acryloyl taurine, sodium salt
N-methacryloyl taurine, potassium salt
N-methacryloyl-aminopropane sulfonic acid, sodium salt
2-acrylamido-2-methylpropane sulfonic acid The mercaptan used to prepare the copolymer of the present invention is preferably a straight chain primary (normal), branched chain primary, or secondary alkyl, preferably a normal alkyl mercaptan having 6 to 20 carbon atoms and more preferably from 7 to 12 carbon atoms or mixtures thereof.

In the presence of oxidizing agents (typically present in the redox generation of free radicals) the sulfide group may be oxidized to a sulfoxide or a sulfone. These oxidized oligomers are still effective surfactants.

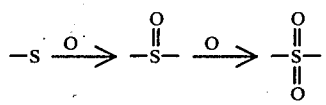

The compositions of the present invention may be prepared by reacting the monomers in a solvent in the presence of a free-radical initiator.

The copolymer is formed, preferably, in a lower alcohol having a boiling point of less than 100° C., e.g., methanol, ethanol, or propanol. Other solvents which dissolve the reactants, the catalyst, and the copolymer, may also be advantageously used.

Generally, the polymerization temperature is maintained at 20°-60° C. Optimum temperature may readily be determined for each polymerization and depends on reaction rate and relative reactivity of the monomers and the mercaptan. In order to facilitate the free-radical propagation necessary for an effective catalytic reaction, an oxygen-free atmosphere is desirable. This may be obtained by passing an inert gas such as nitrogen through the reaction system.

The catalyst employed may be a free radical initiator, such as peroxides or persulfate, or may include redox systems which generate free radical, with or without complexing agents, and, variable valence metal ions. Common initiators are persulfates, peroxides, hydroperoxides, and diazo compounds. As required, activators may be added as, for example, N,N-dimethylaniline. Particularly outstanding results are obtained with organic peroxides and hydroperoxides, hydrogen peroxide, diazo compounds such as a diazo bis(isobutyronitrile) and water soluble persulfates. Specific examples include ammonium persulfate, the alkali metal and alkaline earth metal persulfates and the alkyl peroxides such as lauroyl peroxide, cyclohexyl peroxide, and t-butyl peroxide. Catalytic amounts of initiator are used, preferably between 0.01 and 6.0 g. per 100 parts of vinyl monomers (excluding mercaptans) depending on the particular initiator and the monomer system.

A convenient method of carrying out the reaction is to initially dissolve the alkyl mercaptan and monomers in the solvent. The catalyst and activator, if used, may also be charged initially or added during the reaction. Upon completion of the reaction, the reaction product may be treated with an aqueous base, as for example an alkali metal hydroxide, such as potassium hydroxide, to neutralize some or all of the acid present. By vacuum stripping, the solvent may be separated leaving a water solution of the salt, e.g., the potassium salt, of the copolymers of the present invention.

The product is preferably used as a water solution of its ammonium or alkali metal salt, e.g., potassium or sodium, or amine salt, e.g., lower alkyl or alkanol substituted ammonium salt, such as diethanolamine. The copolymer also may be partially neutralized with alkali metal hydroxides, ammonium hydroxide, or lower alkyl or alkanol amines and used in that state, or neutralization may then be completed with calcium hydroxide or other alkaline earth or Group IV heavy metal oxides or hydroxides.

EXAMPLES

The compounds of this invention are demonstrated by Examples 1 and 2. Example 3 is a comparison example.

EXAMPLE 1

The oligomeric material of this example is prepared in methanol using ammonium persulfate as the initiator. The monomers, mercaptan, and methanol are added to a reaction flask which is immersed in a thermostated water bath, set at 40° C., and equipped with a thermometer, an agitator, a water cooled condenser, and a nitrogen inlet. The solution is agitated and the nitrogen flow is started. When the reaction temperature is reached increments of a 10% ammonium persulfate solution are added to initiate and maintain the reaction.

The following materials were added to the reaction flask:

|  | Parts |
| --- | --- |
| Acrylic Acid | 35.9 |
| Sodium Vinyl Sulfonate (25% in water) | 30.0 |
| Octyl Mercaptan | 11.1 |
| Methyl Acrylate | 53.0 |
| Methanol | 44.5 |

Following the procedure outlined above, the reaction is initiated with a 10% ammonium persulfate solution. A total of 1.6 parts of ammonium persulfate solution was added over two (2) hours. After an additional hour at the reaction temperature the solids was 61.3% indicating essentially 99.5% conversion. The methanol was removed by distillation at the same time that water was added. The mixture was neutralized with ammonium hydroxide to a pH of 4.5 and diluted to a total solids of 48.5% to produce a uniform mixture.

EXAMPLE 2

Example 2 was run as Example 1 using the following materials:

|  | Parts |
| --- | --- |
| Acrylic Acid | 35.9 |
| Sodium Vinyl Sulfonate (25% in water) | 20.0 |
| Octyl Mercaptan | 11.1 |
| Methyl Acrylate | 53.4 |
| Methanol | 44.5 |

A total of 1.6 parts of ammonium persulfate solution was added and the conversion was 99%. The methanol was removed and replaced by water. The product was neutralized with ammonium hydroxide to a pH of 4.4 and diluted to 46% solids.

EXAMPLE 3

This is a comparison example and outside of the present invention. It was run as Example 1 using the following materials:

|  | Parts |
| --- | --- |
| Acrylic Acid | 35.9 |
| Octyl Mercaptan | 11.1 |
| Methyl Acrylate | 53.0 |
| Methanol | 44.5 |

A total of 1.5 parts of ammonium persulfate solution was added, and the yield was 93.5%. The methanol was distilled off and replaced by water. The product was neutralized with ammonium hydroxide to a pH of 4.6 and diluted to 48.4% solids.

EXAMPLE 4

The products of Examples 1, 2, and 3 were compared to show the advantage of the sulfonate group.

The products from Examples 1, 2, and 3 were all diluted to 10% solids and the pH was adjusted to 4.0 with hydrochloric acid. Two phases resulted upon standing.

The phases were separated and each phase was dried in a circulating air oven. The results are shown in Table 5.

TABLE 5

| Composition Parts | Example 1 | Example 2 | Example 3 |
| --- | --- | --- | --- |
| Acrylic Acid | 35.9 | 35.9 | 35.9 |
| Sodium Vinyl Sulfonate | 7.5 | 5.0 | — |
| Methyl Acrylate | 11.1 | 11.1 | 11.1 |
| Octyl Mercaptan | 53.0 | 53.0 | 53.0 |
| % Oligomer in aqueous phase | 72.0 | 75.0 | 16.0 |
| % Oligomer in separated phase | 28.0 | 25.0 | 84.0 |

The results shown in Table 5 demonstrate that low levels of sulfonate in the oligomer greatly solubilized the oligomer in an acidic aqueous medium. As little as 4.8% sodium vinyl sulfonate changes the oligomer from 84% insoluble to 75% soluble.

EXAMPLES 5, 6, 7

Example 5 represents the composition of this invention, and Examples 6 and 7 are for comparison.

Examples 5, 6 and 7 were run as Example 1, using the following materials:

| Example | 5 | 6 | 7 |
| --- | --- | --- | --- |
| Acrylic Acid | 35.9 | 28.2 | 22.3 |
| Sodium Vinyl Sulfonate (25% in water) | 40.0 | 30.5 | 25.0 |
| Octyl Mercaptan | 11.1 | 8.8 | 6.9 |
| Methyl Acrylate | 53.0 | | |
| Butyl Acrylate | | 63.0 | |
| 2 Ethyl hexyl acrylate | | | 70.8 |
| Methanol | 44.5 | 47.5 | 51.6 |
| Sodium Bisulfite | | 0.03 | 0.02 |
| Sodium Persulfate | | 0.1 | 0.05 |
| Ammonium Bisulfite | 0.03 | | |
| Ammonium Persulfate | 0.007 | | |

All were run to over 92% conversion. The product was diluted to 10% solids and neutralized with ammonium hydroxide. The solubilities of these oligomers, which have the same mole percent acid and ester compositions, are shown in Table 6.

TABLE 6

| Example | Mole % (Based on Materials Charged) | | |
|---|---|---|---|
| | 5 | 6 | 7 |
| Acrylic Acid | 39 | 30 | 39 |
| Sodium Vinyl Sulfonate | 6 | 6 | 6 |
| Octyl Mercaptan | 6 | 6 | 6 |
| Methyl Acrylate | 49 | | |
| Butyl Acrylate | | 49 | |
| 2-Ethyl Hexyl Acrylate | | | 49 |
| pH of 10% Solution | 4.4 | 4.5 | 4.5 |
| Number of phases present | 1 | 2 | 2 |
| % Oligomer in non-aqueous phase | 0 | 54 | 56 |

In a mildly acidic aqueous medium, the composition of the invention is soluble whereas the comparison examples are not.

The product of Examples 6 and 7 separated into two phases. The aqueous and nonaqueous phases were separated and dried. The % of oligomer present in the non-aqueous phase was 0, 54, and 56 for the oligomers containing methyl, butyl, and 2-ethylhexyl acrylate respectively. The longer chain esters greatly reduce the water solubility of the oligomer.

EXAMPLE 8

This example illustrates the use of the oligomer from Example 5 as an acid-stable surfactant in an aqueous emulsion polymerization process using aqueous-emulsion-polymerizable ethylenically unsaturated monomeric compounds to form a polymer latex of the invention. The following materials were used:

| Materials | Parts Active |
|---|---|
| Vinyl Acetate | 80 ⎫ mixed |
| Butyl Acrylate | 20 ⎭ |
| Water | 74 |
| Sodium Bicarbonate | 0.8 |
| Ammonium Persulfate | 0.3 initial + 0.4 continuous as 2% solution |
| Oligomer from Example 5 | 0.6 initial |
| | 0.3 when ⅓ of monomers added |
| | 0.3 when ⅔ of monomers added |

The polymerization was run in a resin kettle equipped with a thermometer, agitator, nitrogen inlet, water cooled condenser, and dropping funnels for continuous mixed monomer feed and continuous catalyst feed. The kettle was immersed in a 78° thermostated oil bath. The following procedure was used:
1. Charge 28 parts water, initial persulfate (2% solution), initial oligomer (10% solution) and bicarbonate. The remaining water is from continuous additions.
2. Flush with nitrogen and allow temperature to rise to 70° C.
3. Begin continuous mixed monomer and persulfate additions. Add first ⅓ over 2–3 hours and remaining ⅔ over additional 3 hours.
4. Add additional oligomer as indicated above.
5. Maintain in 78° bath for at least ½ hour after additions have been completed.

The resulting latex was filtered through a double layer of cheese cloth and no coagullum was obtained. The properties of the latex were:

Solids 57%, pH 5.1, Surface Tension 48 d/cm, Brookfield

Viscosity 52 cps., Turbidity 2.2.

The surface tension was obtained on a Du Nouy interfacial tensiometer and is uncorrected. The Brookfield viscosity was determined using number 1 spindle at 20 rpm. The turbidity was the specific extinction coefficient at 700 mu.

EXAMPLE 9

This example illustrates the use of acrylamide in place of methyl acrylate and dodecyl mercaptan in place of octyl mercaptan. It was prepared as in Example 1 using the following materials:

| Acrylic Acid | 39.3 |
|---|---|
| Sodium Vinyl Sulfonate | 40.6 |
| Dodecyl Mercaptan | 16.1 |
| Acylamide | 44.6 |
| Methanol | 300.0 |

The methanol was removed by distillation at the same time water was added to produce an aqueous solution containing 31% solids at pH of 2.5.

We claim:
1. A copolymer having a molecular weight of 700 to 5000, said copolymer being a copolymer of:
    (a) an unsaturated carboxylic acid selected from the group consisting of acrylic acid, methacrylic acid, vinyl acetic acid and crotonic acid;
    (b) another unsaturated monomer, which does not contain a carboxylic acid, selected from the group consisting of styrene, butadiene, vinyl chloride, vinylidene chloride and monomers of the formula

wherein $R_1$ is $-CO_2CH_3$, $-CO_2C_2H_5$, $-CO_2NH_2$, $-CN$, $-CO_2CH_2CH_2OH$, or $-CONHCH_2OH$ and $R_2$ and $R_3$ are methyl or hydrogen;
    (c) an unsaturated monomer containing a sulfonic acid group or its salt selected from the group consisting of
    para-styrene sulfonic acid,
    ortho-styrene sulfonic acid,
    para-isopropenyl sulfonic acid,
    para-vinyl-alpha-toluene sulfonic acid,
    para-isopropenyl-alpha-toluene sulfonic acid,
    sodium para-styrene sulfonate,
    potassium ortho-styrene sulfonate,
    2-bromo-4-isopropenyl benzene sulfonic acid,
    3-vinyl toluene 6-sulfonic acid sodium salt,
    3-ethyl-4-vinyl-benzene sulfonic acid,
    2,3-dichloro-4-vinyl benzene sulfonic acid,
    1,3-disulfo-2-(4-vinyl)propane,
    potassium ethylene sulfonate,
    1-propene 3-sulfonic acid,
    1-propene 2-sulfonic acid,
    1-butylene 3-sulfonic acid,
    2-methyl 1-propene 3-sulfonic acid,
    sodium ethylene sulfonate,
    2-sulfoethylmethacrylate sodium salt,
    2-sulfoethylmethacrylate potassium salt, 1,3-disulfo 2-propanol ester of methacrylic acid,
2-sulfoethylacryalte,
3-sulfopropylacrylate sodium salt,
N-acryloyl taurine,
N-acryloyl taurine sodium salt
N-methacryloyl taurine potassium salt
N-methacryloyl-aminopropane sulfonic acid sodium salt, and
2-acrylamido-2-methylpropane sulfonic acid, and
(d) a primary or secondary alkyl mercaptan having 6 to 20 carbon atoms.

2. A copolymer having a molecular weight of 700 to 5000, containing the groups

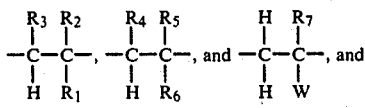

having one R—Z— group and one —H group as terminal groups, wherein the weight percents of the R groups are 2 to 25, the weight percents of the W groups are 1 to 12, the weight percents of the $R_1$ group are 15 to 45, and the weight percents of the $R_6$ groups are 12 to 35, and wherein $R_1$ is —$CO_2CH_3$, —$CO_2C_2H_5$ or —$CO_2NH_2$
$R_2$ is H or $CH_3$
$R_3$ is H or $CH_3$
$R_4$ is H or $CH_3$
$R_5$ is H or $CH_3$
$R_6$ is —$CO_2H$ or its salt
$R_7$ is H or $CH_3$
R is primary or secondary $C_6$-$C_{20}$ alkyl
Z is —S—, —SO—, or —$SO_2$— and
W is —$SO_3H$ or its salt.

3. A copolymer as in claim 2, which is a copolymer of acrylic acid, sodium vinyl sulfonate, octyl or dodecyl mercaptan, and methyl acrylate or acrylamide.

* * * * *

UNITED STATES PATENT AND TRADEMARK OFFICE
CERTIFICATE OF CORRECTION

PATENT NO. : 4,319,014

DATED : March 9, 1982

INVENTOR(S) : Warren J. Peascoe et al.

It is certified that error appears in the above-identified patent and that said Letters Patent are hereby corrected as shown below:

In the Abstract, delete "$CO_2NH_5$" and substitute therefor -- $-CONH_2$ --.

Column 1, line 41, delete "$-CO_2NH_2$" and substitute therefor -- $-CONH_2$ --.

Column 2, line 42, delete "$-CO_2NH_2$" and substitute therefor -- $-CONH_2$ --.

In claim 1, line 43, delete "$-CO_2NH_2$" and substitute therefor -- $-CONH_2$ --.

In claim 2, line 7, delete "$-CO_2NH_2$" and substitute therefor -- $-CONH_2$ --.

Signed and Sealed this

Tenth Day of May 1983

[SEAL]

Attest:

GERALD J. MOSSINGHOFF

Attesting Officer

Commissioner of Patents and Trademarks